United States Patent [19]
Marten et al.

[11] Patent Number: 5,977,286
[45] Date of Patent: Nov. 2, 1999

[54] AMINE-MODIFIED EPOXY RESIN REACTED WITH POLYISOCYANATE

[75] Inventors: Manfred Marten, Mainz; Claus Godau, Kiedrich, both of Germany

[73] Assignee: Vianova Resins GmbH, Mianz-Kastel, Germany

[21] Appl. No.: 08/893,622

[22] Filed: Jul. 11, 1997

[30] Foreign Application Priority Data

Jul. 15, 1996 [DE] Germany .......................... 196 28 409

[51] Int. Cl.⁶ .......................... C08G 59/14; C08L 63/00; C08L 63/02
[52] U.S. Cl. .......................... 528/120; 525/486; 525/504; 525/524; 525/528
[58] Field of Search .......................... 528/120; 525/486, 525/504, 524, 528

[56] References Cited

U.S. PATENT DOCUMENTS

| | | | |
|---|---|---|---|
| 3,518,220 | 6/1970 | Landua et al. | 260/37 |
| 3,538,039 | 11/1970 | Lantz et al. | 260/37 |
| 4,134,866 | 1/1979 | Tominaga et al. | 523/415 |
| 4,316,003 | 2/1982 | Dante et al. | 528/111 |
| 4,745,028 | 5/1988 | Das et al. | 428/391 |
| 5,326,794 | 7/1994 | Pan et al. | 523/454 |
| 5,459,208 | 10/1995 | Marten et al. | 525/523 |

FOREIGN PATENT DOCUMENTS

| | | |
|---|---|---|
| 2145590 | 9/1995 | Canada . |
| 2153095 | 1/1996 | Canada . |
| 0 496 163 | 7/1992 | European Pat. Off. . |
| 496163 | 7/1992 | European Pat. Off. . |
| 0 675 163 | 10/1995 | European Pat. Off. . |
| 29 41 727 | 4/1980 | Germany . |
| 30803 508 | 8/1989 | Germany . |
| 52-101238 | 8/1977 | Japan . |
| 2-212568 | 8/1990 | Japan . |
| 3-185083 | 8/1991 | Japan . |

*Primary Examiner*—Robert E. Sellers
*Attorney, Agent, or Firm*—Foley & Lardner

[57] ABSTRACT

Epoxy resin compositions containing polyepoxides having at least two 1,2-epoxide groups are disclosed. The polyepoxides can be obtained by reacting (i) di- or polyepoxides or mixtures thereof with monoepoxides, (ii) one or more amines chosen from sterically hindered amines, disecondary diamines and diprimary diamines to form an epoxide-amine adduct, and (iii) subsequently reacting the epoxide-amine adduct with polyfunctional isocyanates. The composition also contains curing agents for the polyepoxides and can optionally contain additional 1,2-epoxide compounds and additives. The compositions are useful as coatings for bridging cracks, as adhesives and as constituents of paints.

18 Claims, No Drawings

AMINE-MODIFIED EPOXY RESIN REACTED WITH POLYISOCYANATE

BACKGROUND OF THE INVENTION

1. Field of the Invention

The invention relates to an epoxy resin composition including polyepoxides having at least two 1,2-epoxide groups which are obtainable by reaction of (i) di- or polyepoxides or mixtures thereof with monoepoxides, and (ii) one or more amines chosen from sterically hindered amines, disecondary diamines and diprimary diamines, subsequent reaction of the epoxide-amine adduct with polyfunctional isocyanates, and if appropriate, addition of further 1,2-epoxide compounds and curing agents. The epoxy resin compositions are useful as coatings for bridging cracks, as adhesives and as constituents of paints.

2. Description of Related Art

Epoxy resins, in particular those which are prepared from bisphenol A and epichlorohydrin, are known raw materials for preparing high-quality casting resins, coating compositions, and adhesives. These aromatic epoxy resins, when cured with polyamines, have good adhesive strength on many substrates, in addition to good resistance to chemicals and solvents. Bisphenol A epoxy resins which can be processed without solvents and are of the lowest possible viscosity are of considerable importance, inter alia, for the protection and restoration of concrete buildings. These epoxy resins can be cured using polyamines at ambient temperature. The usefulness of epoxy resins/polyamine systems, however, often is limited by an inadequate elasticity or flexibility in the cross-linked state. For permanent bridging of cracks, coating materials are required which "work" over the crack on the basis of their high elasticity and can withstand exposure to wide changes in temperature due to a high extensibility. Furthermore, elastic epoxy resin systems which still have an adequate elasticity at low temperatures (for example down to −20° C.) are required in the adhesive sector.

In principle, the elasticity of epoxy resin systems can be increased externally by addition of plasticizers or internally by reduction in the cross-linking density. External elasticizing agents, however, are not reactive and are not incorporated into the thermosetting resin network. External plasticizers which can be employed are tar, phthalic acid esters, high-boiling alcohols, ketone resins, vinyl polymers and other products which do not react with epoxy resins and amine hardeners. However, this type of modification is limited only to specific fields of use since it has a number of disadvantages. Thus, these additions lead to a marked interference in the thermosetting resin structure, are limited in their plasticizing effect at low temperatures, tend to exudate when exposed to heat and during aging, and embrittle the cured systems.

To increase the elasticity internally, compounds that react with the epoxy resins or hardeners and that are co-incorporated in the cross-linking are added. Specifically, the elasticizing action is achieved by incorporation of long-chain aliphatic or highly branched additions into the resin or hardener component. These starting components should have the lowest possible viscosities, however, to enable processing of the resin-hardener systems without problems.

U.S. Pat. No. 3,538,039 discloses heat-curing mixtures of (1) an adduct of a polyepoxide and amine, (2) a polyfunctional anhydride and (3) an accelerator for the anhydride. The adduct preferably is built up from a polyepoxide and aromatic amines, such as aniline, m-aminophenol, m-phenylenediamine and methylenedianiline.

U.S. Pat. No. 3,518,220 discloses heat-curable epoxy resin mixtures of (1) an adduct, containing epoxide groups, of a polyepoxide having on average more than 1.0 vicinal epoxide groups and an aromatic amine having at least two active hydrogens on the nitrogen, and (2) 3-aminopyridine. Methylenedianiline, aniline, m-aminophenol, m-phenylenediamine and the like are used as amines.

DE-A 38 03 508 describes a cold-curing resin, which can be after-cross-linked by means of heat, which is based on epoxide and is obtainable by reaction of (i) a bifunctional epoxide of the formula (3)

$$E-X-E \tag{3}$$

in which

E in each case is a radical having an epoxide function and

X is a divalent organic radical, with (ii) a secondary diamine of the formula (4)

$$\tag{4}$$

in which

R$^1$ and R$^2$ can be identical or different and are each hydrocarbon radicals, which can be joined to one another to form a ring system, and Z is a divalent hydrocarbon radical.

The diglycidyl ether of bisphenol A preferably is employed as the epoxy resin and N,N'-dimethylethylenediamine and N,N'-diethylethylenediamine, for example, preferably are employed as the dialkylalkylenediamines. This epoxy resin is used as an adhesive, for coatings and as a matrix composition.

EP-A 0 496 163 describes a cured epoxy resin comprising the reaction product of:

A. a polyepoxide;

B. a chain-lengthening agent chosen from compounds according to the formulae 1 and 2;

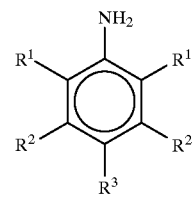

$$\tag{1}$$

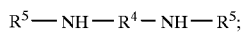

$$\tag{2}$$

C. if appropriate, a catalyst for the reaction between the polyepoxide and the chain-lengthening agent; and D. if appropriate, a dihydroxy-hydrocarbon compound, which can also contain halogen substituents, in which R$^1$, R$^2$ and R$^3$ independently of one another each hydrogen or a substituent which does not substantially influence the reaction between the primary amines and epoxide groups and which does not catalyze the reaction between epoxide groups with one another; R$^4$ is a C$_{1-20}$-alkylene, C$_{5-20}$-cycloalkylene or C$_{6-20}$-arylene group, it being possible for these groups optionally to be substituted by further non-influencing groups; and $R^5$, independently of one another, are in each case a $C_{3-20}$-secondary or tertiary alkyl, $C_{5-20}$-cycloalkyl or $C_{6-20}$-aryl group, it being possible for these groups optionally to be substituted by further non-influencing groups; with the limitation that at least one of the groups $R^1$ or two of the groups $R^2$ and $R^3$ must not influence the reaction.

These chain-lengthened solid epoxy resins are employed, inter alia, for powder coating. They have higher softening points and higher melting points at a higher specific epoxide group content (SEC) (=lower epoxide equivalent weight), when compared with conventionally lengthened epoxy resins. ("Epoxide equivalent weight" in this context denotes the molar mass of the compound in question based on the number of epoxide groups, also called the "EV value". The EV value is the reciprocal of the SEC.) One embodiment relates to the aqueous dispersions of amine-lengthened epoxy resins comprising:

(i) the reaction product of
  A. a polyepoxide;
  B. a chain-lengthening agent corresponding to one of the formulae (1), (2) (see above) and (5) (=formula 17 of EP-A-0,496,163);

$$R^{11}-NH_2 \quad (5);$$

C. if appropriate, a catalyst for the reaction between the polyepoxide and the chain-lengthening agent; and
  D. if appropriate, a dihydroxy-hydrocarbon compound, which can also contain halogen substituents;
(ii) a dispersing agent in a sufficient amount to disperse the composition in water;
(iii) if appropriate, a solubilizing agent; and
(iv) water; in which $R^{11}$ is a linear or branched, unsubstituted or hydroxy-substituted $C_{4-20}$-alkyl group.

In addition to the amines 1 and 2 already mentioned above as component B, compounds of the formula (17) $R^{11}-NH_2$ can additionally be employed in component (i) B for the epoxy resin dispersed in water. More precise details on the nature of a possible branching of the radical $R^{11}$ are not found in the patent specification. For example, as additional compounds of formula (17), n-Hexylamine is employed as the chain-lengthening agent in Example 8, and n-octylamine is employed in Example 12.

The aqueous embodiment of the epoxy resins according to EP-A 0 496 163 comprises complex mixtures in which solid resins are said to be provided as stable dispersions in water. These dispersions are useful, inter alia, as coatings for curing at ambient temperature, in paper latex, in cement dispersions and in other water-containing coatings.

U.S. Pat. No. 4,886,867 describes, inter alia, a method for preparing difunctional epoxy resins of the formula (6)

or -triamine in the presence of acetone. In this method, the reaction of the amine component with the bisphenol A epoxy resin is critical. To prevent gel formation, a solvent must be added during preparation of the adduct. Suitable solvents are ketones and alcohols, and acetone is particularly preferred. The difunctional epoxy resins can be solid or liquid, depending on the starting material, and, in the cured state, provide a transparent, flexible, rubber-like material. The examples of this patent reveal that the diepoxides based on bisphenol A resin (®Epon 828) are semi-solid products and those based on ®Eponex 151 (hydrogenated ®Epon 828) are indeed liquid, but have very high viscosities (cf. Table 1 page 9/10).

According to U.S. Pat. No. 4,316,003, an adduct for curing epoxy resins for aqueous systems is obtained by first reacting excess epoxy resin with a primary monoamine in a 1st stage and then reacting the resulting epoxide with an excess of a polyfunctional amine in a 2nd stage. The products of the 1st stage are prepared in the presence of solvents and are further processed directly in the 2nd stage to provide the amine hardener. No statements are made on the storage stability and on any use of stage 1.

Coatings produced according to EP-A 0 675 143, especially in the case of the highly elastic formulations, show a tear propagation resistance. These coatings, however, still are not adequate for many uses.

SUMMARY OF THE INVENTION

Thus, there exists a need to prepare reactive flexible coatings having a high tear propagation resistance. There also exists a need to provide adhesives that adhere to a variety of substrates and which have a high elasticity at low temperatures.

An object of the present invention therefore is to provide reactive flexible coatings of high tear propagation resistance, and to provide adhesives that adhere well to the most diverse substrates and which still have a high elasticity even at low temperatures, i.e. of 0° C. and lower, for example down to –20° C. It is advantageous if the epoxy resins have viscosities that will allow easy processing without additional expenditure on apparatus. Epoxy resins that have a very low viscosity, i.e., those that are significantly below the viscosity of liquid bisphenol A epoxy resins, are particularly advantageous.

It now has surprisingly been found that epoxy systems that are of low viscosity and—particularly surprisingly—storage-stable, and that can be processed by curing to provide (i) coatings of high tear propagation resistance, (ii) adhesives which are outstandingly elastic at low temperatures and (iii) coatings useful in bridging cracks can be made in accordance with the present invention. Thus, in achieving the aforementioned objects of the invention, there are provide epoxy compositions that are obtained from (A) compounds containing at least two 1,2-epoxide groups that are the reaction product of (A1) epoxides having on average at least two epoxide groups per molecule, and optionally (6)

$$\underset{CH_2CH-R-CH-CH_2N(i-Pr)CH_2CH_2(OCH_2CH_2)_x-N(iPr)CH_2CH-R-CHCH_2}{\overset{O}{\triangle}\quad\overset{OH}{|}\qquad\qquad\qquad\qquad\qquad\overset{OH}{|}\quad\overset{O}{\triangle}}$$

in which R originates from a bisphenol A diglycidyl ether radical, iPr is an isopropyl radical and x is 2 to about 10. The method entails reacting excess epoxy resin with a secondary isopropylamine derivative of a primary polyoxyalkylenedimixed with monoepoxides, chosen from (A11) aliphatic (polyoxyalkylene glycol) glycidyl ethers, and (A 12) glycidyl ethers of polyhydroxyaromatics, and (A2) at least one amine chosen from the group consisting of (A21) particular sterically hindered monoamines (A22) particular disecondary polyether-amines and (A23) particular diprimary diamines, and then subsequent reaction with (A3) polyfunctional, preferably difunctional, isocyanates.

Using the solid epoxides (A) according to the invention, for example those obtained from (A12) bisphenol A or F glycidyl ethers and (A21) particular sterically hindered monoamines, products of any desired intermediate viscosities can be formulated by mixing with the liquid epoxides (A) according to the invention. The composition of the present invention also contains: (B) optionally additional 1,2-epoxide compounds that differ from those according to (A1), or that are portions of compounds (A1) which were not reacted during the preparation of (A); (C) curing agents, and optionally, (D) further additives.

In accordance with these and other objects of the invention, there are provided epoxy resin compositions that can be prepared from:

(A) a compound which contains at least two 1,2-epoxide groups and which is a reaction product of an epoxide-amine adduct obtained by reaction of (A1) compounds having on average at least two 1,2-epoxide groups per molecule, if appropriate mixed with monoepoxides, and (A2) one or more amines chosen from
(A21) sterically hindered monoamines of the formula I

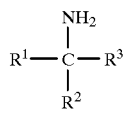
(I)

in which $R^1$ is a branched or unbranched aliphatic, cycloaliphatic, araliphatic or aromatic hydrocarbon radical which has 1 to 30 carbon atoms and is optionally substituted by hydroxyl, alkoxy or halogen groups, $R^2$ and $R^3$ in each case independently of one another are hydrogen or one of the radicals mentioned under $R^1$, hydrogen being particularly preferred for $R^3$, with the proviso that the amino group is not bonded directly to an aromatic radical and, in the case where $R^2$ and $R^3$ are hydrogen, the remaining radical $R^1$ is one of the following substituents

(7)

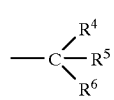
(8)

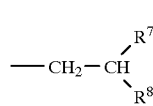
(9)

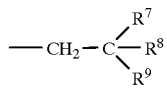
(10)

in which the radicals $R^4$ to $R^9$ in each case independently of one another have the meaning of a branched or unbranched aliphatic, cycloaliphatic, araliphatic or aromatic hydrocarbon radical which has 1 to 30 carbon atoms and is optionally substituted by hydroxyl, alkoxy or halogen groups, and $R^1$ and $R^2$ can form an optionally substituted cycloaliphatic ring having up to 8 carbon atoms, in which case $R^3$ is then a hydrogen atom, and (A22) amines of the formula II

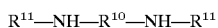
(II)

in which $R^{10}$ is an aliphatic, cycloaliphatic or araliphatic hydrocarbon radical which has 2 to 30 carbon atoms and is optionally substituted by hydroxyl, alkoxy or halogen groups, or an oxyalkylene radical having 1 to 200 oxyalkylene units and $R^{11}$ in each case independently of one another are an aliphatic, cycloaliphatic or araliphatic hydrocarbon radical which has 1–20 carbon atoms and is optionally substituted by hydroxyl, alkoxy or halogen groups, with the proviso that at least one hydrocarbon radical bonded directly to the particular nitrogen atom is a secondary or tertiary radical, and (A23) diprimary diamines of the formula III

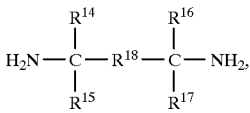
(III)

in which $R^{14}$ to $R^{17}$ are hydrogen or an alkyl group having 1 to 8 carbon atoms and $R^{18}$ is a direct bond, a linear, branched or cyclic, optionally substituted alkylene group or an arylene or heteroarylene group, with the proviso that at least one of the radicals $R^{14}$ to $R^{17}$ is an alkyl group if $R^{18}$ is a direct bond or a linear alkylene group; and $R^{14}$ with $R^{16}$ or $R^{18}$ and the atoms joining them can form a cycloaliphatic, aromatic or heteroaromatic ring, and (A3) polyfunctional isocyanates which contains at least two isocyanate groups per molecule, the polyvalent radical bonded to the isocyanate groups being chosen from aromatic, linear, branched or cyclic aliphatic and mixed aromatic-aliphatic radicals;

(B) optionally, 1,2-epoxide compounds which differ from those according to (A1) and/or which are unreacted portions of the compounds (A1) from the preparation of the compounds (A);

(C) curing agents; and (D) optional further additives.

In accordance with additional objects of the invention, there are provided methods of making epoxy resin compositions comprising preparing epoxy compound (A) by:

reacting epoxides (A1) with one or more amines (A2) until a predetermined epoxide group content is achieved to prepare an epoxide-amine adduct;

reacting the epoxide-amine adduct with polyfunctional isocyanates (A3) to form epoxy compound (A); and mixing epoxy compound (A) with optional additional epoxy compounds (B), with curing agents (C) and with optional further additives.

These and other objects of the present invention will be readily apparent to those skilled in the art upon review of the detailed description which follows.

DETAILED DESCRIPTION OF PREFERRED EMBODIMENTS

Epoxide compounds (A) can be prepared from any compound (A1) that contains at least two 1,2-epoxide groups per molecule. Suitable components (A1) include a large number of known compounds that contain on average more than one epoxide group, preferably two epoxide groups, per molecule. Mixtures of polyepoxides with monoepoxides also can be employed. The useful epoxide compounds (epoxy resins) can be both saturated and unsaturated, as well as aliphatic, cycloaliphatic aromatic or heterocyclic, and can also contain hydroxyl groups. These useful epoxide compounds furthermore can contain those substituents which do not cause troublesome side reactions under the mixing or reaction conditions, for example alkyl or aryl substituents, ether groupings, and the like. Those skilled in the art are capable of determining suitable substituents that will cause deleterious side reactions, given the appropriate mixing and reaction conditions, as well as the ingredients to be mixed and reacted.

Compounds (A1) preferably have specific epoxide group contents ("SEG") of 2,000 to 10,000 mmol/kg (epoxide equivalent weights of 100 to 500 g/mol). Preferably, these compounds include those glycidyl ethers (A12) that are derived from polyhydric phenols, in particular bisphenols and novolaks, the specific epoxide group contents of which are 2,000 to 10,000 mmol/kg, preferably 4,000 to 6,700 mmol/kg (epoxide equivalent weights of 100 to 500, but in particular 150 to 250 g/mol).

Suitable polyhydric phenols useful in this regard include: resorcinol, hydroquinone, 2,2-bis-(4-hydroxyphenyl)-propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis-(4-hydroxyphenyl)-1,1-ethane, bis-(4-hydroxyphenyl)-1,1-isobutane, bis-(4-hydroxy-3-tert-butylphenyl)-2,2-propane, bis-(2-hydroxynaphthyl) methane, 1,5-dihydroxynaphthalene, tris-(4-hydroxyphenyl) methane, bis-(4-hydroxyphenyl) ether, bis-(4-hydroxyphenyl) sulfone, and the like and the chlorination and bromination products of the abovementioned compounds, such as, for example, tetrabromobisphenol A. Liquid diglycidyl ethers based on bisphenol A and bisphenol F having a specific epoxide group content of 5,200 to 5,600 mmol/kg (epoxide equivalent weight of 180 to 190 g/mol) are especially preferred.

It also is possible to use polyglycidyl ethers (A11) of polyalcohols, such as, ethanediol 1,2-diglycidyl ether, propanediol 1,2-diglycidyl ether, propanediol 1,3-diglycidyl ether, butanediol 1,4-diglycidyl ether, pentanediol 1,5-diglycidyl ether, neopentylglycol diglycidyl ether, hexanediol 1,6-diglycidyl ether, diethylene glycol diglycidyl ether, dipropylene glycol diglycidyl ether, higher polyoxyalkylene glycol diglycidyl ethers, such as, higher polyoxyethylene glycol diglycidyl ethers and polyoxypropylene glycol diglycidyl ethers, mixed poly(oxyethyleneoxypropylene) glycol diglycidyl ethers, polyoxytetramethylene glycol diglycidyl ethers, polyglycidyl ethers of glycerol and of 1,2,6-hexanetriol, trimethylolpropane, trimethylolethane, pentaerythritol and sorbitol, polyglycidyl ethers of oxyalkylated polyols (such as, for example, of glycerol, trimethylolpropane and pentaerythritol), diglycidyl ethers of cyclohexanedimethanol, bis-(4-hydroxycyclohexyl)methane and 2,2-bis-(4-hydroxycyclohexyl)propane, polyglycidyl ethers of castor oil, and triglycidyl tris-(2-hydroxyethyl)-isocyanurate. Polyoxyalkylene glycol diglycidyl ethers are especially preferably employed, and among these polyoxypropylene glycol diglycidyl ethers having a specific epoxide group content of 1,250 to 6,700, in particular 2,500 to 3,400 mmol/kg (epoxide equivalent weight of 150 to 800, in particular 300 to 400 g/mol).

In certain cases, small amounts of reactive diluents (monoepoxides) in addition to the polyglycidyl ethers can be co-used in mass fractions of up to 30%, preferably 10 to 20%, based on the mass of the polyglycidyl ethers. Examples of suitable reactive diluents (monoepoxides) include methyl glycidyl ether, butyl glycidyl ether, allyl glycidyl ether, ethylhexyl glycidyl ether, long-chain aliphatic glycidyl ethers, such as cetyl glycidyl ether and stearyl glycidyl ether, monoglycidyl ethers of a higher isomeric alcohol mixture, glycidyl ethers of a mixture of $C_{12}$- to $C_{13}$-alcohols, phenyl glycidyl ether, cresyl glycidyl ether, p-t-butylphenyl glycidyl ether, p-octylphenyl glycidyl ether, p-phenyl-phenyl glycidyl ether, glycidyl ethers of an oxyalkylated lauryl alcohol and monoepoxides, such as epoxidized monounsaturated hydrocarbons (butylene oxide, cyclohexene oxide or styrene oxide) and halogen-containing epoxides, such as epichlorohydrin.

Compounds that also can be used include poly-(N-glycidyl) compounds that are obtainable by dehydrohalogenation of the reaction products of epichlorohydrin and amines, such as aniline, n-butylamine, bis-(4-aminophenyl) methane, m-xylylenediamine or bis-(4-methylaminophenyl)-methane. The poly-(N-glycidyl) compounds also include, however, triglycidyl isocyanurate, triglycidyl urazole and oligomers thereof, N,N'-diglycidyl derivatives of cycloalkylene ureas and diglycidyl derivatives of hydantoins, and the like.

In addition, it is possible to employ polyglycidyl esters of polycarboxylic acids that are obtained by reaction of epichlorohydrin or similar epoxide compounds with an aliphatic, cycloaliphatic or aromatic polycarboxylic acid, such as oxalic acid, succinic acid, adipic acid, glutaric acid, phthalic acid, terephthalic acid, tetrahydrophthalic acid, hexahydrophthalic acid, 2,6-naphthalenedicarboxylic acid and higher dicarboxylic acid diglycidyl esters, such as, for example, dimerized or trimerized linolenic acid. Examples are diglycidyl adipate, diglycidyl phthalate and diglycidyl hexahydrophthalate. Glycidyl esters of unsaturated carboxylic acids and epoxidized esters of unsaturated alcohols or unsaturated carboxylic acids may furthermore be mentioned.

A detailed list of suitable epoxide compounds can be found in the handbook by A. M. Paquin, EPOXIDVERBINDUNGEN UND EPOXIDHARZE (Epoxide Compounds and Epoxy Resins), Springer Verlag, Berlin 1958, Chapter 4, and in Lee and Neville, *Handbook of Epoxy Resins,* 1967, Chapter 2. The disclosures of each of these documents are incorporated by reference herein in their entirety. Mixtures of several epoxy resins can also be used.

The epoxy compounds (A1) are reacted with one or more amines (A2) selected from (A21), (A22) and (A23). No water is needed in that reaction. Any sterically hindered monoamines (A21) can be used in the invention that is capable of reacting with epoxy compounds (A1). Suitable sterically hindered monoamines (A21) which can be employed for preparation of the 1,2-epoxide compounds according to the invention preferably include t-butylamine (2-methyl-2-aminopropane), 2-methyl-2-butylamine, t-alkylamines from the Rohm and Haas Company, such as ®Primene TOA (t-octylamine=1,1,3,3-tetramethylbutylamine), ®Primene 81 R (t-alkylamine having 12 to 14 carbon atoms) and ®Primene JM-T (t-alkylamines having 16 to 22 carbon atoms), 2-amino-2-methyl-1-propanol, 2-amino-2-ethyl-1,3-propanediol, tris(hydroxymethyl)aminomethane, isopropylamine (2-propanamine), sec-butylamine (2-aminobutane), 2-amino-1-butanol, 3-methyl-2-butylamine, 2-pentylamine, 3-pentylamine, cyclopentylamine, 4-methyl-2-pentylamine, cyclohexylamine, 2-heptylamine, 3-heptylamine, 2-methylcyclohexylamine, 3-amino-2,4-dimethylpentane, 6-methyl-2-aminoheptane, 1-phenylethylamine, 1-methylphenylpropylamine and cyclododecylamine, and 2-aminobutane and cyclohexylamine are particularly preferred.

Amines that are furthermore suitable include any of: isobutylamine (2-methyl-1-propanamine), 2-methylbutylamine (1-amino-2-methylbutane), isoamylamine (isopentylamine=1-amino-3-methylbutane), furfurylamine, benzylamine, 4-methoxy-benzylamine, 2-ethylhexylamine, isononylamine (mixture of isomeric nonylamines which comprises 3,5,5-trimethylhexylamine to the extent of about 90%) and the like, and 2-ethylhexylamine is particularly preferred.

Amines (A21) of the formula (15)

(15)

in which $R^{19}$ and $R^{20}$ have the meaning of $R^1$, or $R^{19}$ and $R^{20}$ can form an optionally substituted cycloaliphatic ring having up to 8 carbon atoms, are preferably employed. Particularly preferred amines (A21) inlcude t-alkylamines having 9 to 22, in particular 12 to 14 carbon atoms.

Any amine (A22) can be used in the invention that is capable of reacting with epoxy compounds (A1). Useful amines (A22) include disecondary diamines in which at least one nitrogen atom is sterically hindered by bonding to at least one secondary or tertiary carbon atom. The steric hinderance can be due here to one of the substituents $R^{11}$, such as, for example, in N-methyl-N'-isopropylethylene-diamine or N-methyl-N'-t-butyl-1,3-propanediamine. The steric hindrance can also be formed by the radical $R^{10}$, such as, for example, in N,N'-diethyl-1,2-propanediamine. Disecondary polyether-diamines (polyoxyalkylenediamines, in particular polyoxyethylenediamines) are also preferably employed, and corresponding products are marketed by Condea Chemie GmbH under the name ®Novamin. The secondary polyether-amines ®Novamin N 10 (average molar mass in g/mol: 390), N 20 (560), N 40 (2,150) and N 50 (4,150), inter alia, are also suitable, and the secondary polyether-diamines ®Novamin N 20 and ®Novamin N 40, as well as N,N'-diisopropyl-1,3-propanediamine and N,N'-di-t-butylethylenediamine are particularly preferred.

Any diprimaryamine (A23) can be used in the invention that is capable of reacting with epoxy compounds (A1). Suitable diprimary diamines (A23) include the aliphatic branched diamines having 5 to 20 carbon atoms, such as, for example, neopentanediamine (1,3-diamino-2,2-dimethylpropane), 1,2-diamino-2-methylpropane, 1,2- and 1,4-diaminocyclohexane, m-xylylenediamine, 1,3-bis(aminomethyl)cyclohexane, 1-amino-2-aminomethyl-3,3,5-trimethylcyclopentane and the 3,5,5-isomers thereof, triacetonediamine, 1,8-diamino-p-menthane, isophoronediamine (3-aminomethyl-3,5,5-trimethylcyclohexylamine), 4,4'-diaminodicyclohexylmethane, 3,3'-dimethyl-4,4'-diaminodicyclohexylmethane and 3,8-bis(aminomethyl)tricyclo[5.2.1.0$^{2,6}$]decane and the 4,9-isomer thereof. Mixtures of the amines (A21), (A22) and (A23) can also be used.

The epoxide-amine adducts, i.e., the reaction product of (A1) and (A2), can be reacted with one or more polyfunctional isocyanates (A3). Any polyfunctional isocyanate (A3) can be used in the invention that is capable of reacting with epoxy compounds (A1) and amines (A2). The isocyanates (A3) preferably include those typically used in polyurethane chemistry. Diisocyanates are preferred, and in another preferred form it is also possible to employ diisocyanates in which a proportion of up to 15% by weight, preferably up to 10% by weight, preferably up to 10%, is replaced by isocyanates which are trifunctional or more than trifunctional. In addition, the polyfunctional isocyanates (A3) can be employed in an amount such that 0.01 to 0.625 mol of isocyanate groups are present in the reaction mixture per mole of epoxide groups in the epoxide-amine adduct of (A1) and (A2).

Examples of suitable polyisocyanates include trimethylene diisocyanate, tetramethylene diisocyanate, pentamethylene diisocyanate, hexamethylene diisocyanate, 1,5-diisocyanato-2-methylpentane, 1,12-diisocyanatododecane, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis-(4-isocyanatocyclohexyl)methane, 2,2-bis-(4'-isocyanatocyclohexyl)propane, 4,4'-diisocyanatodiphenyl ether, 2,3-bis-(8-isocyanatooctyl)-4-octyl-5-hexylcyclohexene, tetramethylxylylene diisocyanate, isocyanurates of the above diisocyanates and allophanates of the above diisocyanates. Mixtures of these polyisocyanates can likewise be employed. Aromatic isocyanates, in particular aromatic diisocyanates, are particularly preferred.

The epoxide compounds (A) according to the invention preferably are prepared by first reacting the epoxides (A1) with the amines (A2), while stirring and in general while heating, until a theoretically calculated specific epoxide group content is reached, i.e. until all the active hydrogen atoms of the amine have reacted with the epoxide groups present in excess. This reaction will produce an epoxide-amine adduct. The reaction temperatures typically are maintained at 25 to 200° C., preferably at 50 to 150° C., and more preferably, at 60 to 130° C. The reaction times generally are between a few minutes and several hours, depending on the temperature and the epoxides and amines employed. Those skilled in the art are capable of calculating the theoretical epoxide content, and are capable of reacting the aforementioned components until the theoretical epoxide content is achieved, using the guidelines provided herein.

In most cases, no additional catalysts are necessary for quantitative reaction of the amines with the epoxides. It is advantageous, however, to carry out the reaction under an increased pressure, for example up to 0.5 MPa (5 bar), especially in the case of low-boiling amines.

To prepare the epoxide-amine adducts of the invention from (A1) and (A2), it also is possible to employ various epoxides (A1) as a mixture and to react these directly with the amines (A2). A controlled, stepwise build-up with various epoxides in succession, however, can also be carried out by first reacting an epoxide I (A1) with an excess of the amines, for example 2 active amine hydrogen atoms per epoxide group, and, after complete reaction of the epoxide groups of epoxide I, reacting a further epoxide II (A1) in excess with the active amine hydrogen atoms still available.

Various amines (A2) also can be employed in a corresponding manner, both as a mixture and in a stepwise build-up. In the particular intermediate stages with excess amine, it is possible for free residual amine to be removed by distillation, if appropriate in vacuo. It also is possible to prepare any desired mixtures of the epoxides according to the invention, for example in order to achieve certain processing viscosities and properties of the cured systems.

In a further reaction step, the epoxide-amine adducts prepared by reacting (A1) and (A2), are then reacted with the polyfunctional isocyanates (A3). This reaction preferably is carried out by reacting the epoxide-amine adducts A1/A2 with the isocyanates (A3), while stirring and heating, until the isocyanate has reacted completely. The reaction temperatures usually are in the range of from 25 to 120° C., preferably from 40 to 100° C., and more preferably from 45 to 80° C. The reaction times typically are between a few minutes and several hours, depending on the temperature and the raw materials reacted. Those skilled in the art are capable of reacting the aforementioned components until the isocyanate has reacted completely using the guidelines provided herein.

After compound (A) is formed, it then is mixed with optional components (B) and (D), and it is mixed with curing agents (C) to form the epoxy composition. Like the compounds according to (A1), the epoxide compounds (B) can be chosen from the group consisting of polyepoxides having at least two epoxide groups per molecule. If appropriate, they also can be used as a mixture with monoepoxides. In general, epoxide compounds (B) differ from the compounds employed as (A1), but compounds (B) also can include unreacted residues of the epoxide compounds (A1) from the preparation of the epoxide-amine adducts.

A composition comprising a combination of (A1) polyoxypropylene glycol diglycidyl ether, (A2) 2-aminobutane, (A3) toluylene diisocyanate and (B) diglycidyl ether of bisphenol A or bisphenol F is particularly preferred to prepare the epoxide compound.

Any known amine curing agents for 1,2-epoxides can be employed as component (C) for a two-component epoxy resin. Preferably, curing agents (C) include: aliphatic amines such as the polyalkylenepolyamines, diethylenetriamine and triethylenetetramine, tetraethylenepentamine, pentaethylenehexamine, 2,2,4- and/or 2,4,4-trimethylhexamethylenediamine, bis-(3-aminopropyl)-methylamine, 1,4-bis(3-aminopropyl)-piperazine, N,N-bis (3-aminopropyl)-ethylenediamine and 2-methyl-pentadiamine (®Dytek A), oxyalkylenepolyamines such as polyoxypropylenedi- and -triamines and 1,13-diamino-4,7, 10-trioxatridecane, cycloaliphatic amines, such as isophoronediamine (3,5,5-trimethyl-3-aminomethyl-cyclohexylamine), 4,4'-diaminodicyclohexylmethane, 3,3'-dimethyl-4,4'-diaminodicyclohexylmethane, N-cyclohexyl-1,3-propanediamine, diaminocyclohexanes, in particular 1,2-diaminocyclohexane, 1,4-diamino-3,6-diethylcyclohexane, 1,2-diamino-4-ethylcyclohexane, 1-cyclohexyl-3,4-diaminocyclohexane, 2,2-bis-(4-aminocyclohexyl)-propane and 1,3- and 1,4-bis (aminomethyl)-cyclohexane, piperazine, N-aminoethylpiperazine, TCD-diamine (=3(4), 8(9)-bis (aminomethyl)-tricyclo[5.2.1.0$^{2,6}$]decane), araliphatic amines, such as xylylenediamines (m- and p-xylylenediamine), and aromatic amines, such as phenylenediamines, 4,4'-oxydianiline and 4,4'-diaminodiphenylmethane.

It also is possible to employ mixtures of these amines, and mixtures of these amines and phenylalkanols, such as, for example, benzyl alcohol, phenylethanol and 3-phenylpropanol, and phenoxyalkanols, such as 2-phenoxyethanol and 2- and 3-phenoxypropanol, are likewise suitable; mixtures with benzyl alcohol are particularly preferred.

Adduct hardeners which are reaction products of epoxide compounds, in particular glycidyl ethers of bisphenol A and F, with excess amines also can be used. These include, for example, reaction products of ethylenediamine, 2,2,4- and 2,4,4-trimethylhexamethylenediamine, isophoronediamine, 1,2-diaminocyclohexane, m-xylylenediamine and/or bis (aminomethyl)-cyclohexane, with terminal epoxides, such as, for example, 1,2-propylene oxide or 1,2-hexene oxide, or with glycidyl ethers, such as phenyl glycidyl ether, ethyl-hexyl glycidyl ether or butyl glycidyl ether, or with glycidyl esters, such as ®Cardura E, or polyglycidyl ethers or esters, such as are described under (A1). Polyamidoamine and polyimidazoline hardeners which can be used for in this invention can be prepared by condensation of polyamines and polycarboxylic acids, if appropriate with the addition of monocarboxylic acids, in particular by condensation of polyalkylenepolyamines with polymeric fatty acids obtained by catalytic polymerization of mono- or polyunsaturated fatty acids or by copolymerization of these fatty acids with compounds which are capable of polymerization, such as, for example, styrene.

Mannich bases also can be used as hardeners and can be prepared by condensation of (primary) polyamines having preferably two primary amino groups bonded to aliphatic carbon atoms, preferably diethylenetriamine, triethylenetetramine, isophoronediamine, 2,2,4- or 2,4,4-trimethylhexamethylenediamine or 1,3- and 1,4-bis-(aminomethyl)cyclohexane, in particular m- and p-xylylenediamine, with aldehydes, preferably formaldehyde, and mono- or polyhydric phenols having at least one aldehyde-reactive position on the nucleus, for example the various cresols and xylenols, p-tert-butylphenol, resorcinol, 4,4'-dihydroxydiphenylmethane or 4,4'-dihydroxydiphenyl-2,2-propane, but preferably phenol.

Particularly preferred curing agents (C) useful in the invention include hardeners based on TCD-diamine, Mannich bases, for example based on phenol and/or resorcinol, formaldehyde and m-xylylenediamine, as well as N-aminoethylpiperazine and mixtures of N-aminoethylpiperazine with nonylphenol and/or benzyl alcohol.

In addition to components (A), (B) and (C), the composition according to the invention also can comprise further customary additives (D), such as, for example, accelerators or curing catalysts, further hardeners and additional curable resins or extender resins, as well as the customary paint additives, such as pigments, pigment pastes, dyes, antioxidants, stabilizing agents, flow control agents or thickeners (thixotropic agents), defoamers and/or wetting agents, reactive thinners, fillers, plasticizers, flame retardants and the like. These additives can be added to the curable mixtures a relatively long time beforehand, if appropriate, or not until just before processing.

Accelerators, in particular for curing with amine curing agents, which can be employed include phenols and alkylphenols having 1 to 12 carbon atoms in the alkyl group, cresol, the various xylenols, nonylphenol, polyphenols, such as bisphenol A and F, aromatic carboxylic acids, containing OH groups, such as salicylic acid, m-hydroxybenzoic and p-hydroxybenzoic acid, as well as tertiary amines, such as benzyldimethylamine, 1,3,5-tris(dimethylamino)phenol, mixtures of N-aminoethylpiperazine and alkanolamines (cf. DE-A 29 41 727), ®Accelerator 399 (Texaco Chemical Company) and the like.

Additionally curable resins useful as component (D) include, for example, hydrocarbon resins, phenoxy resins, phenolic resins, polyurethane resins, polysulfides (®Thiokol), reactive liquid polymers of butadiene and corresponding acrylonitrile/butadiene copolymers (®Hycar types), while customary extender resins which may be mentioned here are, inter alia, non-reactive epoxy resin modifying agents, pine oil, tars, phthalic acid esters and coumarone oils.

Flow control agents which can be employed are, for example, acetals, such as polyvinyl formal, polyvinyl acetal, polyvinyl butyral, polyvinyl acetobutyral and the like, polyethylene glycols and polypropylene glycols, silicone resins, and mixtures of zinc soaps, of fatty acids and aromatic carboxylic acids, in particular commercially available products based on polyacrylates. The flow control agents can also be added to component (A) in mass fractions of 0.1 to 4%, preferably 0.2 to 2.0%, based on the total mass.

Adhesion promoters and hydrophobicizing agents which can be employed are, inter alia, silanes. These adhesion promoters can react both with the inorganic substrate and with the organic polymer (adhesive, coating composition or the like) to form firm bonds. The mechanical values, in particular after exposure to moisture, can be improved by promoting the adhesion. Corresponding products are available, for example, under the name ®Dynasylan from Hüls Aktiengesellschaft, or as ®Silan from Degussa AG.

Stabilizers are, for example, aromatic diketones, such as benzoin, which suppress local decomposition and therefore reduce pore formation. These are in general employed in mass fractions of 0.1 to 3, preferably 0.2 to 2%, based on the mass of the total binder (components (A), (B) and (C)).

The dyes and pigments that can be used as additives (D) can be both inorganic and organic in nature. Examples of suitable inorganic dyes and pigments include titanium dioxide, zinc oxide, carbon black and conductive carbon black, such as, for example, ®Printex XE 2 from Degussa AG. The useful organic dyes and pigments can be chosen such that they are stable at the curing temperatures and lead to no intolerable shifts in color shade.

Suitable fillers useful as component (D) include, for example, quartz flour, silicates, chalk, gypsum, kaolin, mica, baryte, organic fillers, such as, for example, polyamide powder, organic and inorganic fibers and the like. Thixotropic agents and thickeners which can be used are, for example, ®Aerosil (highly disperse silicon dioxide, for example types 150, 200, R 202 and R 805 from Degussa) and bentonite types (for example ®Sylodex 24 from Grace and ®Bentone, NL Chemicals).

To prepare the curable mixtures according to the invention, components (A) and, if appropriate, (B) and (C) and, if appropriate, additionally (D) are mixed with the aid of suitable units (stirrers, mills). In the case of components of lower viscosity, this can be accomplished in bulk. The additives and fillers can in general be incorporated using compulsory mixers, such as, for example, dissolvers and kneaders. It may be necessary at this point to avoid premature reaction of the components by cooling the formulated resin/hardener system according to the invention. Those skilled in the art are capable of making the epoxy resin compositions of the present invention, using the guidelines provided herein.

The curable mixtures of the invention can be used in diverse ways, for example, as a constituent of paints for coating the most diverse organic and inorganic substrates, such as metals, concrete, fibrated cement, glass, ceramic, rubber, leather, wood, textiles and plastics, and furthermore for the production of thick-layered floor coatings and intermediate coatings. The mixtures according to the invention are particularly suitable for coverings, adhesives, putties, sealing compositions and moldings in many fields of use where good adhesion, high impact and shock resistance and improved flexibility and elasticity are required, such as, for example, in the building sector for crack-bridging coatings and joint fillings and as additives to polymer cements.

The mixtures can be applied using customary methods, such as brushing, spraying, knife-coating, dipping, pouring, rolling on and laying down as a worm of adhesive from suitable units. The coverings then are usually cured at room temperature, or, if appropriate, at elevated temperatures.

The invention now will be explained by reference to the following non-limiting examples.

EXAMPLES

The specific epoxide group content (SEC), which can be theoretically calculated as a predetermined value, is the quotient of the amount of susubstance of epoxide groups n(EP) and the mass m of the epoxide, and can be represented mathematically as:

$$SEC = \frac{n(EP)}{m}$$

Preparation of the Epoxy Resins

Example 1a (Comparison, Example 1 of EP-A 0 675 143)

2-aminobutane (110 g) was added to 2040 g of ®Beckopox EP 075 (polyoxypropylene glycol diglycidyl ether, Vianova Resins GmbH) having a specific epoxide group content (SEC) of 2,941 mmol/kg (epoxide equivalent (EV) of 340 g/mol) in a four-necked flask with a stirrer, thermometer and condenser, under nitrogen. The reaction mixture was heated to 60° C. and kept at this temperature for two hours, and was then heated slowly to 120° C. in the course of two hours and kept at 120° C. for four hours. The reaction product was cooled to room temperature. The specific epoxide group content was 1,466 mmol/kg (epoxide equivalent 682 g/mol) and the viscosity at 25° C. was 405 mPas.

Example 1b (Comparison, resin mixture in Example 11.1, Table 3 of EP-A 0 675 143)

The epoxy resin from Example 1a was mixed with a liquid epoxy resin ®Beckopox EP 140 (Vianova Resins GmbH; SEC=5,525 mmol/kg, EV=181 g/mol) in a mass ratio of 50%:50%. The resin mixture had a specific epoxide group content of 3,497 mmol/kg (epoxide equivalent of 286 g/mmol).

Example 2a (according to the invention)

The epoxy resin from Example 1a having a specific epoxide group content of 1,466 mmol/kg (epoxide equivalent of 682 g/mol) (970 g) was heated to 50° C. in a four-necked flask with a stirrer, thermometer and condenser, under nitrogen, and 30 g of toluylene diisocyanate were added dropwise in the course of 30 minutes. During this addition, the temperature rose to 56° C. After the exothermic reaction had subsided, the mixture was maintained at 50° C. for an additional 3 hours. The specific epoxide group content was 1,422 mmol/kg (epoxide equivalent 703 g/mol) and the viscosity at 25° C. was 1260 mPas.

Example 2b (according to the invention)

The modified epoxy resin from Example 2a was mixed with a liquid epoxy resin Beckopox EP 140 (SEC=5,525 mmol/kg, EV=181 g/mol) in a mass ratio of 50%:50%. The resin mixture had a specific epoxide group content of 3,472 mmol/kg (epoxide equivalent of 288 g/mol).

Analogously to Example 2a, the epoxy resin from Example 1a was reacted with toluylene diisocyanate in various molar ratios. The other examples according to the invention and results can be found in Table 1.

In each case, 50% mixtures with the liquid epoxy resin Beckopox EP 140 (SEC=5,525 mmol/kg, EV=181 g/mol) were prepared as in Example 2b (cf. Table 2, Examples 1b through 5b). The hardeners employed were the amine hardener ®Beckopox Spezialhärter VEH 2841 and ®Beckopox-Spezialhärter EH 610, both having a specific content of active amine hydrogen atoms of 10.53 mol/kg (so called "amine hydrogen equivalent weight"=molar mass divided by the number of active amine hydrogen atoms of 95 g/mol).

TABLE 1

| Example | $n(EP)$<br>$n(NCO)$ | SEC<br>mmol/kg | EV<br>g/mol | Viscosity at 25° C.<br>mPas |
|---|---|---|---|---|
| 1a | — | 1466 | 682 | 405 |
| 2a | 4:1.0 | 1422 | 703 | 1260 |
| 3a | 4:1.5 | 1399 | 715 | 2800 |
| 4a | 4:1.9 | 1383 | 723 | 6530 |
| 5a | 4:2.0 | 1377 | 726 | 8370 |

$n(EP)$ amount of substance of epoxide groups (in mol)
$n(NCO)$ amount of substance of isocyanate groups (in mol)

Hardener Beckopox-Spezialhärter VEH 2841:

Modified accelerated polyamine adduct based on m-xylylenediamine; specific content of amine hydrogen atoms 10.53 mol/kg (HAV 95 g/mol).

Hardener Beckopox-Spezialhärter EH 610:

Aliphatic polyamine hardener based on aminoethylpiperazine of specific content of amine hydrogen atoms 10.53 mol/kg (HAV 95 g/mol).

Beckopox EP 140:

Liquid bisphenol A epoxy resin; SEC=5,525 mmol/kg [EV=181 g/mol]

TABLE 2

| Example | Mass fraction of epoxy resin in % | Mass fraction from example | Mass fraction of Beckopox EP 140 in % | SEC mmol/kg | EV g/mol | g of hardener VEH 2841 per 100 g of resin mixture | Processing time at 23° C. in minutes | Tear propagation resistance in N/mm |
|---|---|---|---|---|---|---|---|---|
| 1b | 50 | 1a | 50 | 3500 | 286 | 33.2 | 75 | 14.9 |
| 2b | 50 | 2a | 50 | 3470 | 288 | 33.0 | 65 | 24.5 |
| 3b | 50 | 3a | 50 | 3460 | 289 | 32.9 | 59 | 28.4 |
| 4b | 50 | 4a | 50 | 3450 | 290 | 32.8 | 53 | 38.7 |
| 5b | 50 | 5a | 50 | 3450 | 290 | 32.8 | 53 | 38.2 |

Determination of the tear propagation resistance

Specimen preparation

Scotch tape was stuck around the edges of a 145×206 mm$^2$ sheet of plastic, and was stuck in a direction perpendicular to the surface to prevent resin running off. The resin-hardener mixture was weighed out according to the mixing ratio shown in Table 2 and stirred slowly with a spatula (no air bubbles) for 3 to 5 minutes, and 50 g of this were distributed uniformly on the sheet. The mixture was cured completely at room temperature for 7 days and then at 60° C. for 5 hours, and after the shaped article had cooled completely, it was peeled off from the substrate of plastic.

Measurement of the tear propagation resistance

The tear propagation resistance is measured by the tear propagation test with an angled specimen according to Graves with a notch, DIN 53515, at a rate of advance of 500 mm/minute (as stated in the standard).

Production of films and shaped articles (for testing shown in Table 3)

Resin and hardener were mixed according to the ratios of amounts stated in Table 2, and the mixture was applied to sheets of glass in a 250 μm layer and tested as shown in Table 3.

To evaluate the elasticity, a layer 2 to 3 mm thick was poured on sheets of plastic and this was cured at room temperature for 7 days and at 60° C. for 5 hours. The elasticity was evaluated manually.

TABLE 3

| Example | 6 (Comp.) | 7 | 8 | 9 | 10 (Comp.) | 11 |
|---|---|---|---|---|---|---|
| Resin according to example | 1b | 2b | 3b | 5b | 1b | 3b |
| Hardener | EH 610 | EH 610 | EH 610 | EH 610 | VEH 2841 | VEH 2841 |
| Temperature | 25 | 25 | 25 | 25 | 22 | 22 |

TABLE 3-continued

| Example | | 6 (Comp.) | 7 | 8 | 9 | 10 (Comp.) | 11 |
|---|---|---|---|---|---|---|---|
| Processing time | Minutes | 30 | 30 | 24 | 17 | 95 | 75 |
| Drying [DIN 53150] | | | | | | | |
| dust-dry | Hours | >8 < 24 | 7 | 6 | 5.5 | 6.5 | 6.5 |
| non-tacky | Hours | >24 < 48 | >8 < 24 | >8 < 24 | >8 < 24 | >8 < 24 | >8 < 24 |
| Flow | (+) | 1 | 1 | 1 | 1 | 1 | 1 |
| Film clouded | (+) | 1 | 1 | 0 | 0 | 0 | 1–2 | 1 |
| Surface adhesive after 24 h | (+) | 1 | 1 | 0 | 0 | 0 | 0 | 0 |
| Pendulum hardness [DIN 53157] | | | | | | | |
| after 24 h | s | 13st | 18 | 24 | 25 | 12 | 16 |
| after 45 h | s | 21 | 24 | 31 | 32 | 15 | 23 |
| after 7 days | s | 29 | 29 | 36 | 35 | 15 | 29 |
| Resistance to water after 24 h | (+) | 2 | 0.5 | 0.5 | 0.5 | 1–2 | 0 |
| Resistance to hot water after 7 days | (+) | 0 | 0 | 0 | 0 | 0 | 0 |
| Shaped articles: | *) | 1 | 1 | 1–2 | 1–2 | 1 | 1–2 |
| Elasticity after 7 days at room temperature + 5 h 60° C. | | | | | | | |

Notes:
(+) = Visual evaluation according to DIN 53230
st = sticks
*) = 1-pliable, 2-ductile
Comp.: Comparison Evaluation The results of the film testing (Table 3) reveal that the resins according to the invention tend to provide results that are better than, and at least equivalent to, the comparisons.

The processing time and the drying are shortened considerably. The hardness increases and the resistance to water is also improved. The viscosity of the resins (Table 1) also necessarily increases by cross-inking of the epoxide-amine adducts with the diisocyanates, but is still below the viscosity of the standard liquid epoxy resin of about 10,000 mPas. In view of the gain in positive properties, this is still to be regarded as advantageous.

The storage stabilities (Table 4) were not impaired compared with the starting or comparison resin (cf. Example 1a). In particular, the tear propagation resistance of the coatings and shaped articles can be improved outstandingly by the resin-hardener systems according to the invention (Table 2), without detriment to the other properties.

While the invention has been described in detail with reference to particularly preferred embodiments, those skilled in the art recognize that various modifications can be made to the invention without departing from the spirit and scope thereof. All documents described herein are incorporated by reference herein in their entirety.

TABLE 4

Storage stability

Change with respect to the starting value in %

| | | Room temperature | | 50° C. | |
|---|---|---|---|---|---|
| Example | After weeks | SEC | Visc. 25° C. | SEC | Visc. 25° C. |
| 1a (C) | 12 | n.m. | n.m. | −6.2 | +13.4 |
| 2 a | 13 | −0.3 | +0.2 | −3.7 | +9.2 |
| 2 b | 12 | 0 | 0 | −2.0 | +9.0 | n.m.: not measured
C Comparison

What is claimed is:

1. An epoxy resin composition consisting essentially of a mixture of:

(A) compound which contains at least two 1,2-epoxide groups and which is a reaction product of a two-stage reaction, where in a first stage, an epoxide-amine adduct is prepared by reaction of (A1) and (A2)

(A1) a compound having on average at least two 1,2-epoxide groups per molecule, optionally mixed with monoepoxides, and (A2) one or more amines selected from the group consisting of (A21) sterically hindered monoamines of the formula I

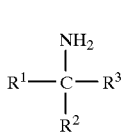

(I)

in which $R^1$ is a branched or unbranched aliphatic, cycloaliphatic, araliphatic, or aromatic hydrocarbon radical having 1 to 30 carbon atoms and optionally being substituted by one or more hydroxyl, alkoxy or halogen groups, $R^2$ and $R^3$ in each case independently of one another are hydrogen or one of the radicals of $R^1$, with the proviso that the amino group is not bonded directly to an aromatic radical and, in the case where $R^2$ and $R^3$ are hydrogen, the remaining radical $R^1$ is selected from one or more of the following substituents

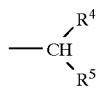

(7)

-continued $$—C{\overset{R^4}{\underset{R^6}{\diagup}}}R^5 \quad (8)$$

$$—CH_2—CH{\overset{R^7}{\underset{R^8}{\diagup}}} \quad (9)$$

$$—CH_2—C{\overset{R^7}{\underset{R^9}{\diagup}}}R^8 \quad (10)$$

in which the radicals
$R^4$ to $R^9$ in each case independently of one another are a branched or unbranched aliphatic, cycloaliphatic, araliphatic, or aromatic hydrocarbon radical having 1 to 30 carbon atoms and optionally is substituted by hydroxyl, alkoxy or halogen groups, and $R^1$ and $R^2$ can form an optionally substituted cycloaliphatic ring having up to 8 carbon atoms, in which case $R^3$ is then a hydrogen atom, and (A23) diprimary diamines of the formula III $$H_2N—\underset{R^{15}}{\overset{R^{14}}{C}}—R^{18}—\underset{R^{17}}{\overset{R^{16}}{C}}—NH_2, \quad (III)$$

in which
$R^{14}$ to $R^{17}$ are hydrogen or an alkyl group having 1 to 8 carbon atoms, and $R^{18}$ is a direct bond, a linear, branched or cyclic, optionally substituted alkylene group or an arylene or heteroarylene group, with the proviso that at least one of the radicals $R^{14}$ to $R^{17}$ is an alkyl group if $R^{18}$ is a direct bond or a linear alkylene group; and $R^{14}$ with $R^{16}$ or $R^{18}$ and the atoms joining them can form a cycloaliphatic, aromatic or heteroaromatic ring, and in a second stage, the epoxy-amine adduct is reacted with (A3) a polyfunctional isocyanate until the isocyanate has reacted completely, that contains at least two isocyanate groups per molecule, wherein a polyvalent radical bonded to the isocyanate groups is selected from the group consisting of aromatic, linear, branched or cyclic aliphatic, and mixed aromatic-aliphatic radicals;

(B) optionally, a 1,2-epoxide compound that is different from those according to (A1), or which is an unreacted portion of the compounds (A1) from the preparation of the compounds (A);

(C) a curing agent selected from the group consisting of aliphatic amines, oxyalkylene polyamines, cycloaliphatic polyamines, araliphatic amines, aromatic polyamines, reaction products of epoxide compounds with excess amines, polyamidoamines, polyimdazolines, Mannich bases prepared from primary polyamines, aldehydes and mono- or polyhydric phenols; and (D) optional additives.

2. A composition as claimed in claim 1, wherein the compound (A1) has a specific epoxide group content of 2,000 to 10,000 mmol/kg.

3. A composition as claimed in claim 1, wherein the compound (A1) is selected from (A11) polyoxyalkylene glycol diglycidyl ethers.

4. A composition as claimed in claim 3, wherein the compound (A11) is polyoxypropylene glycol diglycidyl ether.

5. A composition as claimed in claim 1, wherein the amine (A21) is used and has the formula $$\underset{R^{19}}{\overset{NH_2}{\underset{}{|}}}\overset{}{\underset{R^{20}}{CH}}$$

in which $R^{19}$ and $R^{20}$ are branched or unbranched aliphatic, cycloaliphatic, araliphatic or aromatic hydrocarbon radicals having 1 to 30 carbon atoms and optionally being substituted by hydroxyl, alkoxy or halogen groups, or $R^{19}$ and $R^{20}$ can form an optionally substituted cycloaliphatic ring having up to 8 carbon atoms.

6. A composition claimed in claim 5, wherein the amine (A21) is used and is 2-aminobutane.

7. A composition as claimed in claim 5, wherein the amine (A21) is used and is cyclohexylamine.

8. A composition as claimed in claim 1, wherein the polyfunctional isocyanate (A3) comprises diisocyanates.

9. A composition as claimed in claim 1, wherein the compounds (A) are reaction products of (A1) polyoxypropylene glycol diglycidyl ether, (A2) 2-aminobutane and (A3) polyfunctional isocyanate, and the compound (B) is present and is selected from diglycidyl ethers of bisphenol A and bisphenol F.

10. A composition as claimed in claim 1, wherein the curing agent (C) is aminoethylpiperazine.

11. A composition claimed in claim 1, wherein the polyfunctional isocyanates (A3) are employed in an amount such that 0.01 to 0.625 mol of isocyanate groups are present in the reaction mixture per mole of epoxide groups in the epoxide-amine adduct of (A1) and (A2).

12. A composition as claimed in claim 1, wherein the polyfunctional isocyanate (A3) comprises diisocyanates.

13. A composition as claimed in claim 1, wherein the polyfunctional isocyanates (A3) comprises aromatic polyfunctional isocyanates.

14. A composition as claimed in claim 1, wherein the polyfunctional isocyanate (A3) is a diisocyanate in which up to 15% by weight of diisocyanate is replaced by an isocyanate which is trifunctional or more than trifunctional.

15. A composition as claimed in claim 1, wherein the polyfunctional isocyanate (A3) is toluylene diisocyanate.

16. A crack-bridging coating comprising the composition as claimed in claim 1.

17. An adhesive comprising the composition as claimed in claim 1.

18. A method of making the composition as claimed in claim 1, comprising:
reacting epoxide (A1) with one or more amine (A2) until a predetermined epoxide group content is achieved to prepare an epoxide-amine adduct;
reacting the epoxide-amine adduct with a polyfunctional isocyanate (A3) to form epoxy compound (A); and
mixing epoxy compound (A) with optional additional epoxy compounds (B), with a curing agent (C) and with optional further additives.

* * * * *